United States Patent
Werner et al.

(10) Patent No.: US 6,668,088 B1
(45) Date of Patent: Dec. 23, 2003

(54) DIGITAL SIGNAL COMPRESSION ENCODING WITH IMPROVED QUANTISATION

(75) Inventors: Oliver Hartwig Werner, South Craydon (GB); Nicholas Dominic Wells, Brighton (GB); Michael James Knee, Petersfield (GB)

(73) Assignees: British Broadcasting Corporation, London (GB); Snell & Wilcox Limited, Middlesex (GB)

(*) Notice: Subject to any disclaimer, the term of this patent is extended or adjusted under 35 U.S.C. 154(b) by 0 days.

(21) Appl. No.: 09/380,047

(22) PCT Filed: Feb. 25, 1998

(86) PCT No.: PCT/GB98/00582

§ 371 (c)(1),
(2), (4) Date: Nov. 29, 1999

(87) PCT Pub. No.: WO98/38800

PCT Pub. Date: Sep. 3, 1998

(30) Foreign Application Priority Data

Feb. 25, 1997 (GB) .............................................. 9703831
Feb. 25, 1997 (GB) .............................................. 9703834

(51) Int. Cl.[7] .............................. G06K 9/36; G06K 9/46
(52) U.S. Cl. ................... 382/239; 375/240.03; 382/251
(58) Field of Search ................................. 382/236, 239, 382/245, 246, 248, 250, 251; 375/240.02–240.07, 240.18, 240.2, 240.23; 348/404.1, 405.1, 419.1, 395.1

(56) References Cited

U.S. PATENT DOCUMENTS

| 5,245,427 A | * | 9/1993 | Kunihiro | ................. 348/400.1 |
| 5,293,434 A | * | 3/1994 | Feig et al. | ................... 382/234 |
| 5,301,242 A | * | 4/1994 | Gonzales et al. | ........... 382/239 |
| 5,412,429 A | * | 5/1995 | Glover | ................... 375/240.11 |
| 5,521,643 A | | 5/1996 | Yim | .............................. 348/419 |
| 5,768,436 A | * | 6/1998 | Keesman | ..................... 382/248 |
| 5,778,192 A | * | 7/1998 | Schuster et al. | ............ 709/247 |
| 5,933,194 A | * | 8/1999 | Kim et al. | ............... 348/403.1 |

FOREIGN PATENT DOCUMENTS

| DE | 35 11 659 | 10/1986 | ............ H03M/7/38 |
| EP | 0 478 230 | 4/1992 | ............ H04N/7/30 |
| EP | 0 509 576 | 10/1992 | ........... H04N/7/133 |
| EP | 0 513 520 | 11/1992 | ........... H04N/7/133 |
| EP | 0 599 258 | 6/1994 | ........... H04N/7/133 |
| EP | 0 705 039 | 4/1996 | ............ H04N/7/30 |
| EP | 0 710 030 | 5/1996 | ............ H04N/7/26 |
| EP | 0 711 079 | 5/1996 | ............ H04N/7/50 |
| EP | 0 720 375 | 7/1996 | ............ H04N/7/26 |
| EP | 0 739 138 | 10/1996 | ............ H04N/7/26 |
| WO | 95 35628 | 12/1995 | ............ H04N/7/26 |
| WO | 96 34496 | 10/1996 | ............ H04N/7/30 |

* cited by examiner

*Primary Examiner*—Timothy M. Johnson
(74) *Attorney, Agent, or Firm*—McDermott, Will & Emery

(57) ABSTRACT

In compression encoding of a digital signal, such as MPEG2, transform coefficients are quantised with the lower bound of each interval being controlled by a parameter $\lambda$. In the MPEG2 reference coder, for example, $\lambda=0.75$. Because the quantised coefficients are variable length coded, improved quality or reduced bit rates can be achieved by controlling $\lambda$ so as to vary dynamically the bound of each interval with respect to the associated representation level. The parameter $\lambda$ can vary with coefficient amplitude, with frequency, or with quantisation step size. In a transcoding operation, $\lambda$ can also vary with parameters in the initial coding operation.

4 Claims, 3 Drawing Sheets

DIGITAL SIGNAL COMPRESSION ENCODING WITH IMPROVED QUANTISATION

FIELD OF THE INVENTION

This invention relates to the compression of digital video, audio or other signals.

BACKGROUND OF THE INVENTION

Compression encoding generally involves a number of separate techniques. These will usually include a transformation, such as the block-based discrete cosine transform (DCT) of MPEG-2; an optional prediction step; a quantisation step and variable length coding. This invention is particularly concerned in this context with quantisation.

The quantisation step maps a range of original amplitudes onto the same representation level. The quantisation process is therefore irreversible. MPEG-2, (in common with other compression standards such as MPEG-1, JPEG, CCITT/ITU-T Rec.H.261 and ITU-T Rec.H.263) defines representation levels and leaves undefined the manner in which the original amplitudes are mapped onto a given set of representation levels.

In general terms, a quantizer assigns to an input value, which may be continuous or may previously have been subjected to a quantisation process, a code usually selected from quantization levels immediately above and immediately below the input value. The error in such a quantization will generally be minimised if the quantization level closest to the input value is selected. In a compression system, it is further necessary to consider the efficiency with which respective quantization levels may be coded. In variable length coding, the quantization levels which are employed most frequently are assigned the shortest codes.

Typically, the zero level has the shortest code. A decision to assign a higher quantization level, on the basis that it is the closest, rather than a lower level (and especially the zero level) will therefore decrease coding efficiency. In MPEG2, the overall bit rate of the compressed signal is maintained beneath a pre-determined limit by increasing the separation of quantization levels in response to a tendency toward higher bit rate. Repeated decisions to assign quantization levels on the basis of which is closest, may through coding inefficiency thus lead to a coarser quantization process.

The behaviour of a quantizer in this respect may be characterised through a parameter $\lambda$ which is arithmetically combined with the input value, with one value of $\lambda$ (typically $\lambda=1$) representing the selection of the closest quantization level or "rounding". A different value of $\lambda$ (typically $\lambda=0$) will in contrast represent the automatic choice of the lower of the two nearest quantization levels, or "truncating". In the MPEG2 reference coder, an attempt is made to compromise between the nominal reduction in error which is the attribute of rounding and the tendency toward bit rate efficiency which is associated with truncating, by setting a standard value for $\lambda$ of $\lambda=0.75$.

Whilst particular attention has here been paid to MPEG2 coding, similar considerations apply to other methods of compression encoding of a digital signal, which including the steps of conducting a transformation process to generate values and quantising the values through partitioning the amplitude range of a value into a set of a adjacent intervals, whereby each interval is mapped onto a respective one of a set of representation levels which are to be variable length coded, such that a bound of each interval is controlled by a parameter $\lambda$. The transformation process may take a large variety of forms, including block-based transforms such as the DCT of MPEG2, and sub-band coding.

SUMMARY OF THE INVENTION

It is an object of one aspect of the present invention to provide an improvement in such a method which enables higher quality to be achieved at a given bitrate or a reduction in bitrate for a given level of quality.

Accordingly, the present invention is in one aspect characterised in that $\lambda$ is controlled so as to vary dynamically the bound of each interval with respect to the associated representation level.

Suitably, wherein each value is arithmetically combined with $\lambda$.

Advantageously, $\lambda$ is:

a function of the quantity represented by the value;

where the transformation is a DCT, a function of horizontal and vertical frequency;

a function of the quantisation step size; or a function of the amplitude of the value.

In a particular form of the present invention, the digital signal to be encoded has been subjected to previous encoding and decoding processes and $\lambda$ is controlled as a function of a parameter in said previous encoding and decoding processes.

In a further aspect, the present invention consists in a (q, $\lambda$) quantiser operating on a set of transform coefficients $x_k$ representative of respective frequency indices $f_k$ in which $\lambda$ is dynamically controlled in dependence upon the values of $x_k$ and $f_k$.

Advantageously, $\lambda$ is dynamically controlled to minimise a cost function $D+\mu H$ where D is a measure of the distortion introduced by the quantisation in the uncompressed domain and H is a measure of compressed bit rate.

BRIEF DESCRIPTION OF THE DRAWINGS

The invention will now be described by way of example with reference to the accompanying drawings, in which.

DETAILED DESCRIPTION OF THE INVENTION

In the specifically mentioned compression standards, the original amplitude x results from a discrete cosine transform (DCT) and is thus related to a horizontal frequency index $f_{hor}$ and a vertical frequency index $f_{ver}$. Whilst this approach is taken as an example in what follows, the invention is not restricted in this regard.

Figure 1:
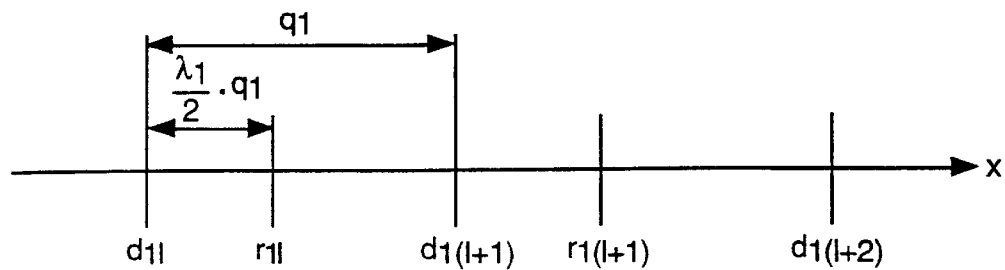
FIG. 1 is a diagram illustrating the relationships between representation levels, decision levels and the value of $\lambda$.

In general, a quantiser describes a mapping from an original amplitude x of frequencies $f_{hor}$ and $f_{ver}$ onto an amplitude y=Q(x). The mapping performed by the quantiser is fully determined by the set of representation levels $\{r_l\}$ and by the corresponding decision levels $\{d_l\}$ as illustrated in FIG. 1. All original amplitudes in the range $d_l \leq x < d_{(l+1)}$ are mapped onto the same representation level $y=Q(x)=r_l$. As can be seen from FIG. 1, consecutive decision levels are related by the quantisation step size q: and for a given representation level $r_l$, the corresponding decision level is $$d_{l+1}=d_l+q \quad (1)$$

calculated as:

$$d_l = r_l - \frac{\lambda}{2} \cdot q \quad (2)$$

The quantiser is fully specified by the quantisation step-size q and the parameter $\lambda$ for a given set of representation levels $\{r_l\}$. Therefore, a quantiser that complies with equations (1) and (2) can be referred to as a $(q,\lambda)$ quantiser.

Currently proposed quantisers, as described in the reference coders for the H.261, H.263, MPEG-1 and MPEG-2 standards, all apply a special type of $(q, \lambda)$ quantiser in that a fixed value of $\lambda$ is used: for example $\lambda=0.75$ in the MPEG-2 reference coder or $\lambda=1.0$ in the MPEG-1 reference coder for quantisation of intra-DCT-coefficients.

According to one aspect of this invention, $\lambda$ is not constant but is a function that depends on the horizontal frequency index $f_{hor}$, the vertical frequency index $f_{ver}$, the quantisation step-size q and the amplitude x:

$$\lambda=\lambda(f_{hor}, f_{ver}, q, x) \quad (3)$$

Examples of ways in which the function may usefully be derived to improve picture quality in video compression at a given bit-rate—or to reduce the required bit-rate at a given picture quality—will be set out below.

The invention extends also to the case of transcoding when a first generation amplitude $y_1=Q_1(x)$ is mapped onto a second generation amplitude $y_2=Q_2(y_1)$ to further reduce the bit-rate from the first to the second generation without having access to the original amplitude x. In this case, the first generation quantiser $Q_1$ and the second generation quantiser $Q_2$ are described as a $(q_1, \lambda_1)$-type quantiser and a $(q_2, \lambda_2)$-type quantiser, respectively. The second generation $\lambda_2$ value is described as a function:

$$\lambda_2=\lambda_2(f_{hor}, f_{ver}, q_1, \lambda_1, q_2, \lambda_{2,ref}, y_1) \quad (4)$$

The parameter $\lambda_{2,ref}$ that appears in Eqn. (4) is applied in a reference $(q_2, \lambda_{2,ref})$-type quantiser. This reference quantiser bypasses the first generation and directly maps an original amplitude x onto a second generation reference amplitude $y_{2,ref}=Q_{2,ref}(x)$.

The functional relationship of Eqn. (4) can be used to minimise the error $(y_2-y_{2,ref})$ or the error $(y_2-x)$. In the first case, the resulting second generation quantiser may be called a maximum a-posteriori (MAP) quantiser. In the second case, the resulting second generation quantiser may be called a mean squared error (MSE) quantiser. Examples of the second generation $(q_2, \lambda_{2,MAP})$-type and $(q_2, \lambda_{2,MSE})$-type quantisers are given below. For a more detailed explanation of the theoretical background, reference is directed to the paper "Transcoding of MPEG-2 intra frames"—Oliver Werner—IEEE Transactions on Image Processing 1998, which will for ease of reference be referred to hereafter as "the Paper". A copy of the Paper is appended to British patent application No. 9703831 from which the present application claims priority.

Figure 2:
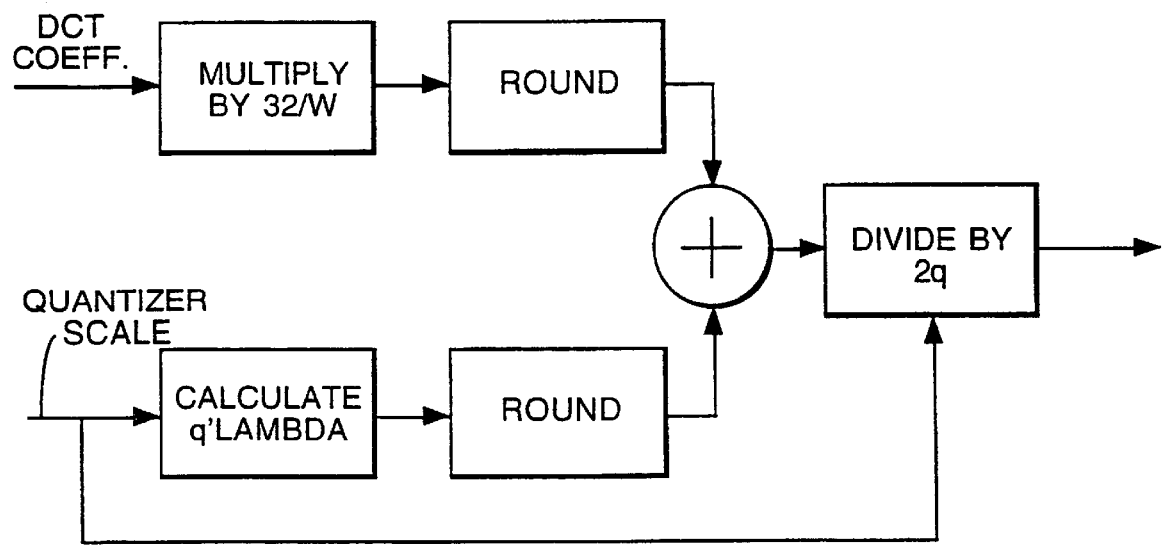
FIG. 2 is a block diagram representation of the quantization process in the MPEG2 reference coder.

The present invention refers specifically to quantization of 'intra' DCT coefficients in MPEG2 video coding but can be applied to non-intra coefficients, to other video compression schemes and to compression of signals other than video. In MPEG2, the prior art is provided by what is known as Test Model 5 (TM5). The quantization scheme of TM5 for positive intra coefficients is illustrated in FIG. 2.

Figure 3:
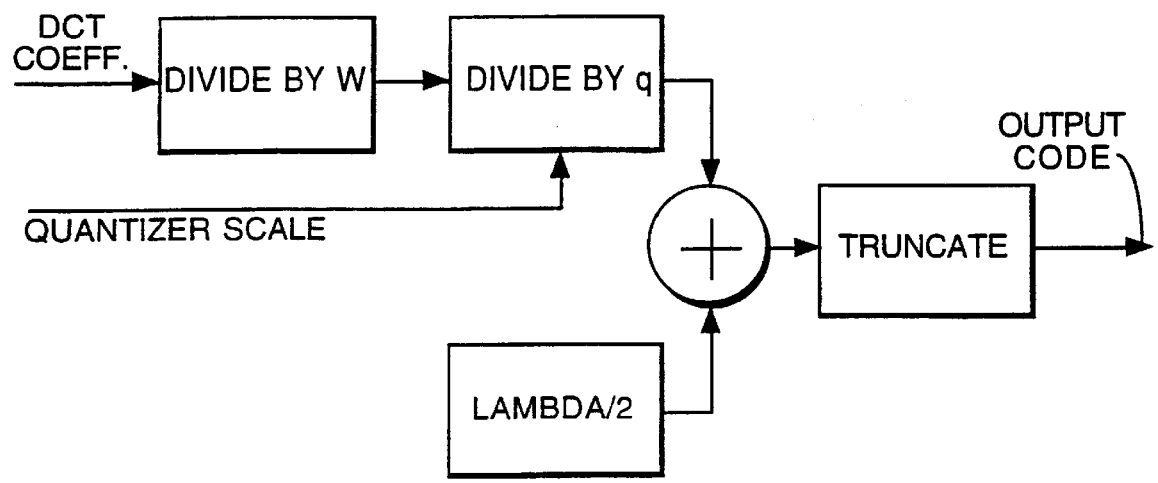
FIG. 3 is a block diagram representation of a simplified and improved quantization process.

In order to simplify the description, the above diagram will be replaced by FIG. 3, which illustrates essentially the same quantizer except for small values of q, where it corrects an anomaly as described in the Paper.

In this quantizer, the incoming coefficients are first divided by quantizer weighting matrix values, W, which depend on the coefficient frequency but which are fixed across the picture, and then by a quantizer scale value q which can vary from one macroblock to the next but which is the same for all coefficient frequencies. Prior to the adder, the equivalent inverse quantizer reconstruction levels are simply the integers 0, 1, 2 . . . . A fixed number $\lambda/2$, is then added to the value and the result truncated. The significance of $\lambda$ is that a value of 0 makes the quantizer (of the value input to the adder) a simple truncation, while a value of 1 makes it a rounding operation. In TM5, the value of $\lambda$ is fixed at 0.75.

Figure 4:
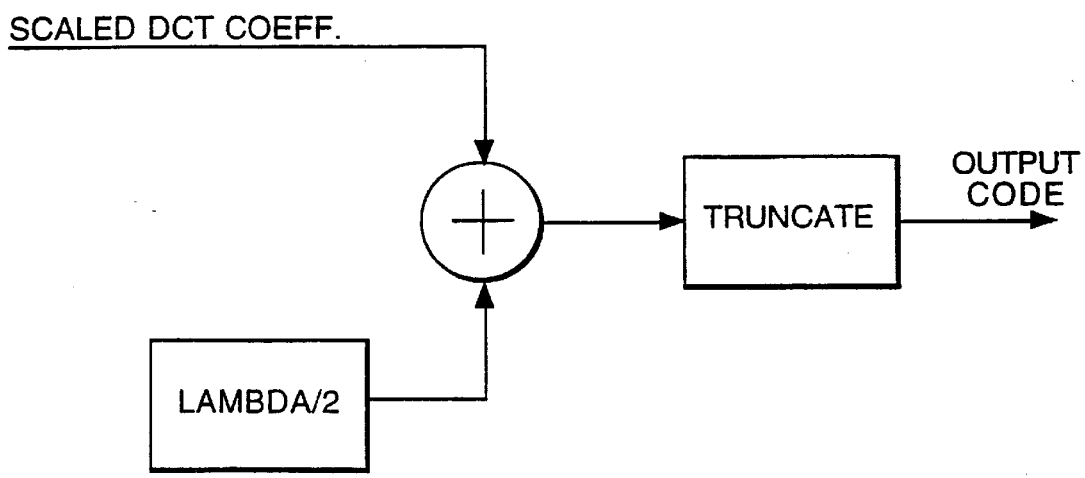
FIG. 4 is a block diagram representation of the core elements of FIG. 3.

Attention will hereafter be focused on the operation of the 'core' quantizer shown in FIG. 4.

In a class of MPEG-2 compatible quantisers for, intra frame coding, non-negative original dct-coefficients x (or the same coefficients after division by weighting matrix values W) are mapped onto the representation levels as:

$$y = Q(x) = \left\lfloor \frac{x}{q} + \frac{\lambda}{2} \right\rfloor \cdot q \quad (5)$$

The floor function $\lfloor a \rfloor$ extracts the integer part of the given argument a.

Negative values are mirrored:

$$y=-Q(|x|) \quad (6)$$

The amplitude range of the quantisation step-size q in eq. (1) is standardised; q has to be transmitted as side information in every MPEG-2 bit stream. This does not hold for the parameter $\lambda$ in eq. (1). This parameter is not needed for reconstructing the dct-coefficients from the bit stream, and is therefore not transmitted. However, the $\lambda$-value controls the mapping of the original dct-coefficients x onto the given set of representation levels $$r_l=l \cdot q \quad (7)$$

According to eq. (1), the (positive) x-axis is partitioned by the decision levels $$d_l = \left(l - \frac{\lambda}{2}\right) \cdot q \quad l = 1, 2, \ldots \quad (8)$$

Each $x \in [d_l, d_{l+1})$ is mapped onto the representation level $y=r_l$. As a special case, the interval $[0, d_1)$ is mapped onto $y=0$.

The parameter $\lambda$ can be adjusted for each quantisation step-size q, resulting in a distortion rate optimised quantisation: the mean-squared-error $$D=E[(x-y)^2] \quad (9)$$

is minimised under a bit rate constraint imposed on the coefficients y. In order to simplify the analysis, the first order source entropy $$H = \Sigma_l \cdot P_l \cdot \log_2 P_l \quad (10)$$

of the coefficients y instead of the MPEG-2 codeword table is taken to calculate the bit rate. It has been verified in the Paper that the entropy H can be used to derive a reliable estimate for the number of bits that result from the MPEG-2 codeword table. In Eqn. (10), $P_l$ denotes the probability for the occurrence of the coefficient $y = r_l$.

The above constrained minimisation problem can be solved by applying the Lagrange multiplier method, introducing the Lagrange multiplier $\mu$. One then gets the basic equation to calculate the quantisation parameter $\lambda$:

$$\frac{\partial D}{\partial \lambda} + \mu \cdot \frac{\partial H}{\partial \lambda} = 0 \quad (11)$$

Note, that the solution for $\lambda$ that one obtains from Eqn. (11) depends on the value of $\mu$. The value of $\mu$ is determined by the bit rate constraint.

$$H \leq H_0 \quad (12)$$

where $H_0$ specifies the maximum allowed bit rate for encoding the coefficients y. In general, the amplitude range of the Lagrange multiplier is $0 < \mu < \infty$. In the special case of $H_0 \rightarrow \infty$, one obtains $\mu \rightarrow 0$. Conversely for $H_0 \rightarrow 0$, one obtains in general $\mu \rightarrow \infty$.

The Laplacian probability density function (pdf) is an appropriate model for describing the statistical distribution of the amplitudes of the original dct-coefficients. This model is now applied to evaluate analytically Eqn. (11). One then obtains a distortion-rate optimised quantiser characteristic by inserting the resulting value for $\lambda$ in eq. (5).

Due to the symmetric quantiser characteristic for positive and negative amplitudes in Eqns. (5) and (6), we introduce a pdf p for describing the distribution of the absolute original amplitudes $|x|$. The probability $P_0$ for the occurrence of the coefficient $y=0$ can then be specified as $$P_0 = \int_0^{(1 - \frac{\lambda}{2}) \cdot q} p(x) \, dx \quad (13)$$

Similarly, the probability $P_l$ for the coefficient $|y|$ becomes $$P_l = \int_{(l - \frac{\lambda}{2}) \cdot q}^{(l + 1 - \frac{\lambda}{2}) \cdot q} p(x) \, dx \quad l = 1, 2, \ldots \quad (14)$$

With Eqns. (13) and (14), the partial derivative of the entropy H of eq. (10) can be written after a straightforward calculation as $$\frac{\partial H}{\partial \lambda} = \frac{q}{2} \cdot \sum_{l \geq 0} p\left(\left(l + 1 - \frac{\lambda}{2}\right) \cdot q\right) \cdot \log_2 \frac{P_l}{P_{l+1}} \quad (15)$$

From eq. (9) one can first deduce $$D = \int_0^{(1 - \frac{\lambda}{2}) \cdot q} x^2 \cdot p(x) \, dx + \sum_{l \geq 1} \int_{(l - \frac{\lambda}{2}) \cdot q}^{(l + 1 - \frac{\lambda}{2}) \cdot q} (x - l \cdot q)^2 \cdot p(x) \, dx \quad (16)$$

and further from eq. (16)

$$\frac{\partial D}{\partial \lambda} = \frac{-q^3}{2} \cdot (1 - \lambda) \cdot \sum_{l \geq 0} p\left(\left(l + 1 - \frac{\lambda}{2}\right) \cdot q\right) \quad (17)$$

It can be seen from eq. (17) that $$\frac{\partial D}{\partial \lambda} \geq 0 \text{ if } 0 \leq \lambda \leq 1 \quad (18)$$

Thus, when $\lambda$ is increased from zero to one, the resulting distortion D is monotonically decreasing until the minimum value is reached for $\lambda = 1$. The latter is the solution to the unconstrained minimisation of the mean-squared-error, however, the resulting entropy H will in general not fulfil the bit rate constraint of eq. (12).

Under the assumption of $P_l \geq P_{l+1}$ in eq. (15), we see that $\partial H / \partial \lambda \geq 0$. Thus, there is a monotonic behaviour: when $\lambda$ is increased from zero to one, the resulting distortion D monotonically decreases, at the same time the resulting entropy H monotonically increases. Immediately, an iterative algorithm can be derived from this monotonic behaviour. The parameter $\lambda$ is initially set to $\lambda = 1$, and the resulting entropy H is computed. If H is larger than the target bit rate $H_0$, the value of $\lambda$ is decreased in further iteration steps until the bit rate constraint, eq. (12) is fulfilled. While this iterative procedure forms the basis of a simplified distortion-rate method proposed for transcoding of I-frames, we continue to derive an analytical solution for $\lambda$.

Eqns. (15) and (17) can be evaluated for the Laplacian model:

$$p(x) = \beta \cdot \alpha \cdot e^{-\alpha x} \text{ if } x \geq d_1 = \left(1 - \frac{\lambda}{2}\right) \cdot q \quad (19)$$

After inserting the model pdf of Eqn. (19) in Eqns. (15) and (17), it can be shown that the basic equation (11) leads then to the analytical solution for $\lambda$, $$\lambda = 1 - \frac{\mu}{q^2} \cdot \left[ h(z) + (1 - z) \cdot \log_2\left(\frac{P_0}{1 - P_0}\right) \right] \quad (20)$$

with $z = e^{-\alpha \cdot q}$ and the 'z'-entropy $$h(z) = -z \cdot \log_2 z - (1 - z) \cdot \log_2(1 - z) \quad (21)$$

Eqn. (20) provides only an implicit solution for $\lambda$, as the probability $P_0$ on the right hand side depends on $\lambda$ according to eq. (13). In general, the value of $P_0$ can be determined only for known $\lambda$ by applying the quantiser characteristic of Eqns. (5) and (6) and counting the relative frequency of the event $y=0$. However, eq. (20) is a fixed-point equation for $\lambda$ which becomes more obvious if the right hand side is described by the function $$g(\lambda) = 1 - \frac{\mu}{q^2} \cdot \left[ h(z) + (1 - z) \cdot \log_2\left(\frac{P_0}{1 - P_0}\right) \right] \quad (22)$$

resulting in the classical fixed-point form $\lambda = g(\lambda)$. Thus, it follows from the fixed point theorem of Stefan Banach that the solution for $\lambda$ can be found by an iterative procedure with $$\lambda_{j+1} = g(\lambda_j) \quad (23)$$

in the (j+1)-th iteration step. The iteration of (23) converges towards the solution for an arbitrary initial value $\lambda_0$ if the function g is 'self-contracting', i.e. Lipschitz-continuous with a Lipschitz-constant smaller than one. As an application of the mean theorem for the differential calculus, it is not difficult to prove that g is always 'self-contracting' if the absolute value of the partial derivative is less than one. This yields the convergence condition $$1 > \left|\frac{\partial g}{\partial \lambda}\right| = \frac{1}{2 \cdot \ln(2)} \cdot \frac{\mu}{q} \cdot (1-z) \cdot \frac{\alpha}{P_0} \quad (24)$$

A distortion-rate optimised quantisation method will now be derived based on the results obtained above. As an example, a technique is outlined for quantising the AC-coefficients of MPEG-2 intra frames. It is straightforward to modify this technique for quantising the dct-coefficients of MPEG-2 inter frames, i.e. P- and B-frames.

Firstly, one has to take into account that the 63 AC-coefficients of an 8×8 dct-block do not share the same distribution. Thus, an individual Laplacian model pdf according to eq. (19) with parameter $\alpha_i$ is assigned to each AC-frequency index i. This results in an individual quantiser characteristic according to Eqns. (5) and (6) with parameter $\lambda_i$. Furthermore, the quantisation step-size $q_i$ depends on the visual weight $w_i$ and a frequency-independent qscale parameter as $$q_i = \frac{w_i \cdot qscale}{16} \quad (25)$$

For a given step-size $q_i$, the quantisation results in a distortion $D_i(\lambda_i)$ and a bit rate $H_i(\lambda_i)$ for the AC-coefficients of the same frequency index i. As the dct is an orthogonal transform, and as the distortion is measured by the mean-squared-error, the resulting distortion D in the spatial (sample/pixel) domain can be written as $$D = c \cdot \sum_i D_i(\lambda_i) \quad (26)$$

with some positive normalising constant c. Alternatively the distortion can measured in the weighted coefficient domain in order to compensate for the variation in the human visual response at different spatial frequencies.

Similarly, the total bit rate H becomes $$H = \sum_i H_i(\lambda_i) \quad (27)$$

For a distortion rate optimised quantisation, the 63 parameters $\lambda_i$ have to be adjusted such that the cost function $$D + \mu \cdot H \quad (28)$$

is minimised. The non-negative Lagrange multiplier $\mu$ is determined by the bit rate constraint $$H \leq H_0 \quad (29)$$

Alternatively, if the distortion is expressed in the logarithmic domain as:

$$D' = 20 \log_{10} D \text{ dB} \quad (28a)$$

The cost function to be minimised becomes:

$$B = D' + \lambda' H \quad (28b)$$

Where $\mu'$ is now an a priori constant linking distortion to bit rate.

A theoretical argument based on coding white noise gives a law of 6 dB per bit per coefficient. In practice, observation of actual coding results at different bit rates gives a law of k dB per bit, where k takes values from about 5 to about 8 depending on the overall bit rate. In practice, the intuitive '6 dB' law corresponds well with observation.

Additionally, the qscale parameter can be changed to meet the bit rate constraint of Eqn. (25). In principle, the visual weights $w_i$ offer another degree of freedom but for simplicity we assume a fixed weighting matrix as in the MPEG-2 reference decoder. This results in the following distortion rate optimised quantisation technique which can be stated in a 'C'-language-like form:

```
/* Begin of quantising the AC-coefficients in MPEG-2 intra frames*/
D_min = ∞;
for (qscale = qmin; qscale ≤ qmax; qscale = qscale + 2)
/* linear qscale table*/
{
μ = 0;
do {
    Step 1: determine λ_1, λ_2, ..., λ_63 by minimising D + μ · H;
    Step 2: calculate H = Σ H_i(λ_i);
    μ = μ + δ; /*δ to be selected appropriately*/
    }while (H > H_o);
Step 3: calculate D = c · Σ D_i (λ_i);
if (D < D_min){
    qscale_opt = qscale;
    for (i = 1; i ≤ 63; i = i + 1)λ_{i,opt} = λ_i;
    D_min = D;}
}
for (i = 1; i ≤ 63; i = i + 1)
```

$$q_{i,opt} = \frac{w_i \cdot qscale_{opt}}{16}$$

{

$$y = Q_i(x) = \left\lfloor \frac{|x|}{q_{i,opt}} + \frac{\lambda_{i,opt}}{2} \right\rfloor \cdot q_{i,opt} \cdot sgn(x)$$

quantise all AC-coefficients of frequency-index i by
}
/*End of quantising the AC-coefficients in MPEG-2 intra frames*/

There are several options for performing Step 1–Step 3:
1. Options for performing Step 1
   The parameters $\lambda_1, \lambda_2, \ldots \lambda_{63}$ can be determined
   a) analytically by applying Eqns. (20)–(23) of Section 3.
   b) iteratively by dynamic programming of D+$\mu$·H, where either of the options described in the next points can be used to calculate D and H.
2. Options for performing Step 2
   H=$\Sigma H_i(\lambda_i)$ can be calculated
   a) by applying the Laplacian model pdf, resulting in $$H = \sum_i h(P_{0,i}) + (1 - P_{0,i}) \cdot \frac{h(z_i)}{1 - z_i}. \quad (32)$$

where $h(P_{0,i})$ and $h(Z_i)$ are the entropies as defined in eq. (21) of $P_{O,i}$ (eq. (13)) and $Z_i = e^{-\alpha_i \cdot q_i}$, respectively. Note that $P_{0,i}$ in Eqn. (32) can be determined by counting for each dct-frequency index i the relative frequency of the zero-amplitude $y = Q_i(x) = 0$. Interestingly, eq. (32) shows that the impact of the quantisation parameters $\lambda_i$ on the resulting bit rate H only consists in controlling the zero-amplitude probabilities $P_{0,i}$.

b) from a histogram of the original dct-coefficients, resulting with Eqns. (10), (13) and (14) in $$H = -\sum_i \sum_l P_{l,i} \cdot \log_2 P_{l,i} \quad (33)$$

c) by applying the MPEG-2 codeword table

3. Options for performing Step 3

$D = c \cdot \Sigma D_i (\lambda_i)$ can be calculated a) by applying the Laplacian model pdf of Eqn. (19) and evaluating Eqn. (16).

b) by calculating $D = E[(x-y)^2]$ directly from a histogram of the original dct-coefficients x.

Depending on which options are chosen for Step 1–Step 3, the proposed method results in a single pass encoding scheme if the Laplacian model pdf is chosen or in a multi pass scheme if the MPEG-2 codeword table is chosen. Furthermore, the method can be applied on a frame, macroblock or on a 8×8-block basis, and the options can be chosen appropriately. The latter is of particular interest for any rate control scheme that sets the target bit rate $H_0$ either locally on a macroblock basis or globally on a frame basis.

Furthermore, we note that the proposed method skips automatically high-frequency dct-coefficients if this is the best option in the rate-distortion sense. This is indicated if the final quantisation parameter $\lambda_{i,opt}$ has a value close to one for low-frequency indices i but a small value, e.g. zero, for high-frequency indices.

A distortion-rate optimised quantisation method for MPEG-2 compatible coding has been described, with several options for an implementation. The invention can immediately be applied to standalone (first generation) coding. In particular, the results help designing a sophisticated rate control scheme.

The quantiser characteristic of eqs. (5) and (6) can be generalised to $$y = Q(x) = r(x) + \left\lfloor \frac{x - r(x)}{q(x)} + \frac{\lambda(x)}{2} \right\rfloor \cdot q(x) \quad (34)$$

for non-negative amplitudes x. The floor-function $\lfloor a \rfloor$ in eq. (34) returns the integer part of the argument a. Negative amplitudes are mirrored, $$y = -Q(|x|) \quad (35)$$

The generalisation is reflected by the amplitude dependent values $\lambda(x)$, $q(x)$, $r(x)$ in eq. (34). For a given set of representation levels $\ldots < r_{l-1} < r_l < r_{l+1} < \ldots$ and a given amplitude x, the pair of consecutive representation levels is selected that fulfils $$r_{l-1} \leq x < r_l \quad (36)$$

The value of the local representation level is then set to $$r(x) = r_{l-1} \quad (37)$$

The value of the local quantisation step-size results from $$q(x) = q_l = r_l - r_{l-1} \quad (38)$$

A straightforward extension of the rate-distortion concept detailed above yields for the local lambda parameter, very similar to eq. (20).

$$\lambda(x) = \lambda_l = 1 - \frac{\mu}{q_l^2} \cdot \log_2\left(\frac{P_{l-1}}{P_l}\right), \quad (39)$$

(l=1, ..., L)

Similar to eqs. (13), (14), the probabilities in eq. (39) depend on the lambda parameters, $$P_0 = \int_0^{r_1 - \frac{\lambda_1}{2} \cdot q_1} p(x) \, dx \text{ and} \quad (40)$$

$$P_l = \int_{r_l - \frac{\lambda_l}{2} \cdot q_l}^{r_{l+1} - \frac{\lambda_{l+1}}{2} \cdot q_{l+1}} p(x) \, dx \quad l \geq 1 \quad (41)$$

Therefore, eq. (39) represents a system of non-linear equations for determining the lambda parameters $\lambda_1, \ldots, \lambda_L$. In general, this system can only be solved numerically.

However, eq. (39) can be simplified if the term $\log_2(P_{l-1}/P_l)$ is interpreted as the difference $$l_l - l_{l-1} = \log_2\left(\frac{P_{l-1}}{P_l}\right) \quad (42)$$

of optimum codeword lengths $$l_l = -\log_2 P_l \quad l_{l-1} = -\log_2 P_{l-1} \quad (43)$$

associated with the representation levels $r_l$, $r_{l-1}$.

A practical implementation of the above will now be described.

Once the probability distribution, parametric or actual, of the unquantized coefficients is known, it is possible to choose a set of quantizer decision levels that will minimise the cost function B, because both the entropy H and the distortion D are known as functions of the decision levels for a given probability distribution. This minimization can be performed off-line and the calculated sets of decision levels stored for each of a set of probability distributions.

In general, it will be seen that the optimum value of $\lambda$ corresponding to each decision level is different for different coefficient amplitudes. In practice, it appears that the greatest variation in the optimum value of $\lambda$ with amplitude is apparent between the innermost quantizer level (the one whose reconstruction level is 0) and all the other levels. This means that it may be sufficient in some cases to calculate, for each coefficient index and for each value (suitably quantized) of the probability distribution parameter, two values of $\lambda$, one for the innermost quantizer level and one for all the others.

Figure 5:
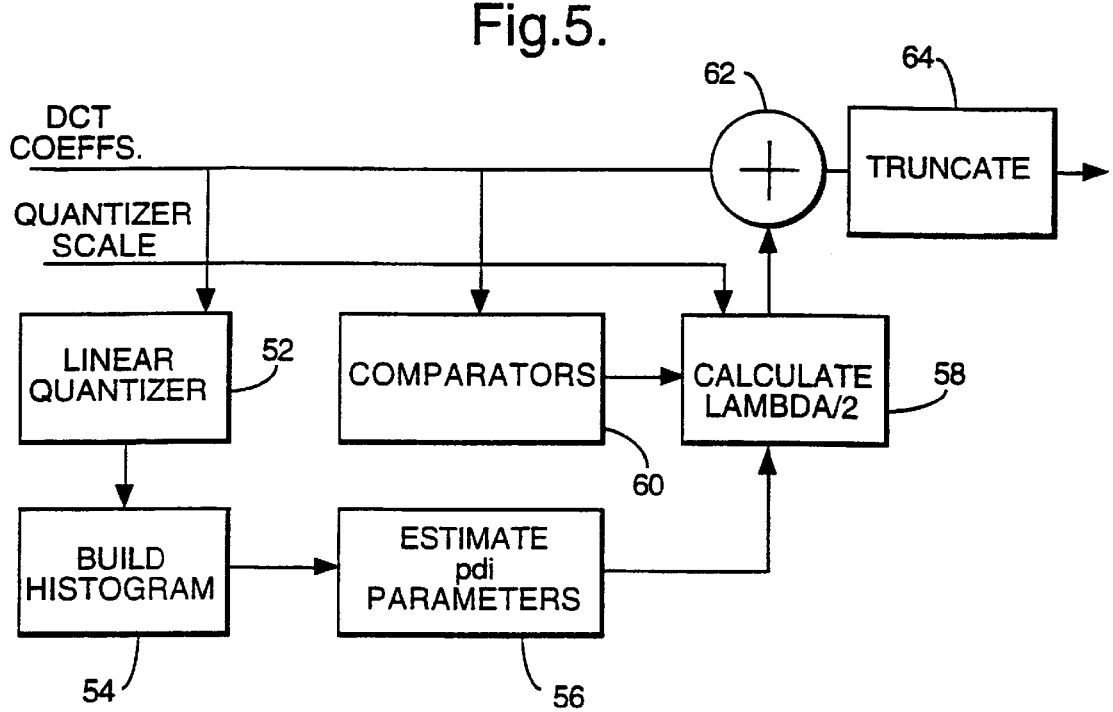
FIG. 5 is a block diagram representation of a quantization process according to one aspect of the present invention.

A practical approach following the above description is shown in FIG. 5.

The DCT coefficients are taken to a linear quantizer 52 providing the input to a histogram building unit 54. The histogram is thus based on linearly quantized versions of the input DCT coefficients. The level spacing of that linear quantizer 52 is not critical but should probably be about the same as the average value of q. The extent of the histogram function required depends on the complexity of the parametric representation of the pdf; in the case of a Laplacian or Gaussian distribution it may be sufficient to calculate the mean or variance of the coefficients, while in the 'zero excluded' Laplacian used in the Paper it is sufficient to calculate the mean and the proportion of zero values. This histogram, which may be built up over a picture period or longer, is used in block 56 as the basis of an estimate of the pdf parameter or parameters, providing one of the inputs to the calculation of λ in block 58.

Another input to the calculation of λ is from a set of comparators 60 which are in effect a coarse quantizer, determining in which range of values the coefficient to be quantized falls. In the most likely case described above, it is sufficient to compare the value with the innermost non-zero reconstruction level. The final input required to calculate λ is the quantizer scale.

In general, an analytical equation for λ cannot be obtained. Instead, a set of values can be calculated numerically for various combinations of pdf parameters, comparator outputs and quantizer scale values, and the results stored in a lookup table. Such a table need not be very large (it may, for example, contain fewer than 1000 values) because the optima are not very sharp.

The value of λ calculated is then divided by 2 and added in adder 62 to the coefficient prior to the final truncation operation in block 64.

Instead of using variable codeword lengths that depend on the current probabilities according to eq. (43), a fixed table of variable codeword lengths $C_0, \ldots, C_L$ can be applied to simplify the process. The values of $C_0, \ldots, C_L$ can be determined in advance by designing a single variable length code, ie. a Huffman code, for a set of training signals and bit rates. In principle, they can also be obtained directly from the MPEG2 variable-length code table. The only complication is the fact that MPEG2 variable-length coding is based on combinations of runs of zero coefficients terminated by non-zero coefficients.

One solution to this problem is to estimate 'equivalent codeword lengths' from the MPEG2 VLC tables. This can be done quite easily if one makes the assumption that the probability distributions of the DCT coefficients are independent of each other. Another possibility is to consider the recent past history of quantization within the current DCT block to estimate the likely effect of each of the two possible quantization levels on the overall coding cost.

Then, eq. (39) changes to $$\lambda(x) = \lambda_l = 1 - \frac{\mu}{q_l^2}(C_l - C_{l-1}), (l = 1, \ldots, L) \quad (44)$$

The resulting distortion-rate optimised quantisation algorithm is essentially the same as detailed previously except that the lambda parameters are calculated either from eq. (39) or eq. (44) for each pair of horizontal and vertical frequency indices.

A simplified method of calculating λ(x) will now be described, where only the local distortion is considered for each coefficient.

Here, we make use of the fact that the variable-length code (VLC) table used for a given picture in MPEG2 is fixed and known. This should simplify and make more accurate the calculations of the trade-off between bit rate and distortion. In particular, the calculations can be made on a coefficient basis since the effect on the bit rate of the options for quantizing a particular coefficient is immediately known. The same is true (although a little more difficult to justify) of the effect on the quantizing distortion.

If we accept the assumptions implied in the above paragraph, then we can very simply calculate the value of the decision level to minimize the local contribution to the cost function B. This will in fact be the level at which the reduction in the bit count obtained by quantizing to the lower reconstruction level (rather than the higher level) is offset exactly by the corresponding increase in quantizing distortion.

If the two reconstruction levels being considered have indices i and i+1, the corresponding codewords have lengths $L_i$, and $L_{i+1}$, and the quantizer scale is q, then:

(i) the reduction in bit count is $L_{i+1}-L_i$.

(ii) the local increase in distortion is $20 \log_{10}q(1-\lambda/2)-20 \log_{10}q\lambda/2$.

Combining these using the law linking distortion to bit rate, we have $$6(L_{i+1}-L_i)=20\ log_{10}(2/\lambda-1) \quad (45)$$

or, more simply $$L_{i+1}-L_i=log_2(2/\lambda-1) \quad (46)$$

leading to $$\lambda=2/(1+2^{(L_{i+1}-L_i)})\text{tm (47)}$$

This elegant result shows that the value of λ depends here only on the difference in bit count between the higher and lower quantizer reconstruction levels.

Figure 6:
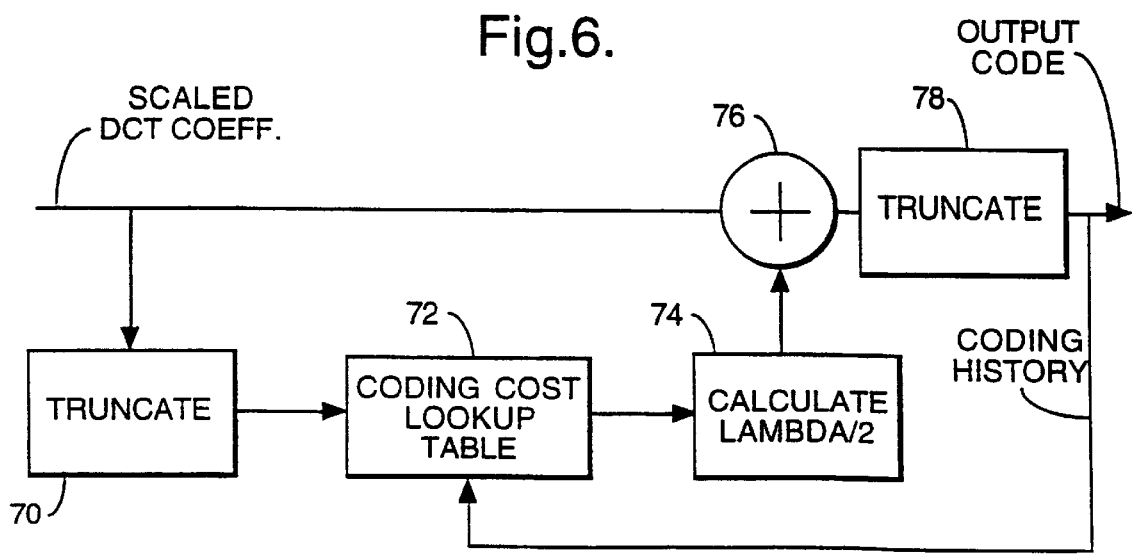
FIG. 6 is a block diagram representation of a quantization process according to a further aspect of the present invention.

The fact that the level of λ is now independent both of the coefficient probability distribution and the quantizer scale leads to the following, much simplified implementation shown in FIG. 6.

Here, the DCT coefficients are passed to the side-chain truncate block 70 before serving as the address in a coding cost lookup table 72. The value of lambda/2 is provided to adder 76 by block 74 and the output is truncated in truncate block 78.

There have been described a considerable number of ways in which the present invention may be employed to improve quantisation in a coder; still others will be evident to the skilled reader. It should be understood that the invention is also applicable to transcoding and switching.

The question will now be addressed of a two stage-quantiser. This problem is addressed in detail in the Paper which sets out the theory of so-called maximum a-posteriori (MAP) and the mean squared error (MSE) quantisers. By way of further exemplification there will now be described an implementation of the MAP and MSE quantiser for transcoding of MPEG2 [MPEG2] intra AC-coefficients that result from an 8×8 discrete cosine transform (dct).

The class of the first generation quantisers $y_1=Q_1(x)$ specified by these equations is spanned by the quantisation step-size $q_1$ and the parameter $\lambda_1$; such a quantiser is called $(q_1, \lambda_1)$-type quantiser.

In the transcoder, the first generation coefficients $y_1$ are mapped onto the second generation coefficients $y_2=Q_2(y_1)$ to further reduce the bit rate. Under the assumption of a $(q_1, \lambda_1)$-type quantiser in the first generation, e.g. MPEG2 reference coder TM5, it follows from the results set out in the Paper that the MAP quantiser $Q_{2,map}$ and the MSE quantiser $Q_{2,mse}$ can be implemented as a $(q_2, \lambda_{2,map})$-type and a $(q_2, \lambda_{2,mse})$-type quantiser, respectively. For both, the MAP and the MSE quantiser, the second generation step-size $q_2$ is calculated from the second generation parameters $w_2$ and $qscale_2$. However, there are different equations for calculating $\lambda_{2,map}$ and $\lambda_{2,mse}$.

With the results of the Paper, it follows that $\lambda_{2,map}$ can be calculated as $$\lambda_{2,map} = \lambda_{2,ref} + (\mu_{map} - \lambda_1) \cdot \frac{q_1}{q_2} \quad (48)$$

and $\lambda_{2,mse}$ as $$\lambda_{2,mse} = 1 + (\mu_{mse} - \lambda_1) \cdot \frac{q_1}{q_2} \qquad (49)$$

The parameter $\lambda_{2,ref}$ can be changed in the range $0 \leq \lambda_{2,ref} \leq 1$ for adjusting the bit rate and the resulting signal-to-noise-ratio. This gives an additional degree for freedom for the MAP quantiser compared with the MSE quantiser. The value of $\lambda_{2,ref}=0.9$ is particularly preferred. The parameter $\mu_{map}$ and the parameter $\mu_{mse}$ are calculated from the first generation quantisation step-size $q_1$ and a z-value, $$\mu_{map} = -\frac{2}{\ln(z^{q_1})} \cdot \ln\left(\frac{2}{1+z^{q_1}}\right) \qquad (50)$$

$$\mu_{mse} = -\frac{2}{\ln(z^{q_1})} \cdot \frac{1-(1-\ln(z^{q_1})) \cdot z^{q_1}}{1-z^{q_1}} \qquad (51)$$

The amplitude range of the values that result from these equations can be limited to the range $0 \leq \mu_{map}, \mu_{mse} \leq 2$. Similarly, the amplitude range of the resulting values can be limited to $0 \leq \lambda_{2,map}, \lambda_{2,mse} \leq 2$.

The z-value has a normalised amplitude range, ie. $0 \leq z \leq 1$, and can be calculated either from the first generation dct-coefficients $y_1$ or from the original dct-coefficients x as described in the Paper. In the latter case, the z-value is transmitted as additional side information, e.g. user data, along with the first generation bit stream so that no additional calculation of z is required in the transcoder. Alternatively, a default z-value may be used. An individual z-value is assigned to each pair of horizontal and vertical frequency indices. This results in 63 different z-values for the AC-coefficients of an 8×8 dct. As a consequence of the frequency dependent z-values, the parameters $\lambda_{2,map}$ and $\lambda_{2,mse}$ are also frequency dependent, resulting in 63 ($q_2$, $\lambda_{2,map}$)-type quantisers and 63 ($q_2$, $\lambda_{2,mse}$)-type quantisers, respectively. Additionally, there are different parameter sets for the luminance and the chrominance components. The default z-values for the luminance and the chrominance components are shown in Table 1 and Table 2 respectively.

TABLE 1

Normalised z-values, eg. 256 × z, for luminance (default)

|   | 0 | 1 | 2 | 3 | 4 | 5 | 6 | 7 |
|---|---|---|---|---|---|---|---|---|
| 0 |   | 252 | 250 | 247 | 244 | 239 | 233 | 232 |
| 1 | 251 | 249 | 247 | 244 | 240 | 235 | 233 | 231 |
| 2 | 249 | 247 | 245 | 242 | 238 | 236 | 234 | 233 |
| 3 | 247 | 245 | 243 | 240 | 236 | 235 | 234 | 233 |
| 4 | 246 | 242 | 239 | 237 | 235 | 233 | 232 | 235 |
| 5 | 242 | 238 | 235 | 234 | 230 | 229 | 231 | 233 |
| 6 | 237 | 231 | 226 | 225 | 222 | 222 | 226 | 231 |
| 7 | 222 | 211 | 210 | 205 | 202 | 208 | 214 | 222 |

TABLE 2

Normalised z-values, ie. 256 × z, for chrominance (default)

|   | 0 | 1 | 2 | 3 | 4 | 5 | 6 | 7 |
|---|---|---|---|---|---|---|---|---|
| 0 |   | 248 | 242 | 230 | 212 | 176 | 158 | 179 |
| 1 | 246 | 240 | 233 | 219 | 193 | 154 | 156 | 177 |
| 2 | 239 | 233 | 224 | 209 | 180 | 148 | 154 | 173 |
| 3 | 229 | 221 | 211 | 196 | 163 | 141 | 150 | 166 |
| 4 | 219 | 208 | 198 | 181 | 153 | 133 | 143 | 166 |
| 5 | 207 | 193 | 182 | 171 | 140 | 126 | 143 | 161 |
| 6 | 193 | 176 | 162 | 154 | 127 | 118 | 137 | 163 |
| 7 | 169 | 145 | 148 | 129 | 102 | 108 | 127 | 158 |

For a description of preferred techniques for making available to subsequent coding and decoding processes, information relating to earlier coding and decoding processes, reference is directed to EP-A-0 765 576; EP-A-0 807 356 and WO-A-9803017.

It is further shown that the first order source entropy of the second generation coefficients can be used to derive an estimate of the bit rate that results from the MPEG-2 intra vlc codeword table. This would simplify the computation of the bit rate if the transcoder had to decide upon either the TM5, the mse or the map cost function based on the best rate-distortion performance. The resulting PSNR values can be compared in the transcoder on the basis of the Laplacian model pdf. This could be simplified for the map cost function due to the monotonic behaviour of the rate-distortion performance, e.g. after setting a target bit rate on a frame or block basis, the parameter of the reference quantiser can be increased until the first order source entropy exceeds the target bit rate. The investigation of an 'easy-to-implement' algorithm based on the above rate-distortion considerations is a promising goal of future work. Furthermore, the presented results can be adapted for transcoding of MPEG-2 inter-frames, i.e. P- and B-frames, involving motion compensating prediction. However, the problem of drift [OW-94] [OW-96] between the predictors of the encoder and the decoder has then additionally to be taken into account.

What is claimed is:

1. A compression transcoder for changing the bit rate of a compressed digital signal which has been compression encoded in a first generation quantiser $Q_1$, having a quantisation step size $q_1$ and a parameter $\lambda_1$ which controls the bounds of decision levels to be mapped onto representation levels of the quantiser, which quantiser operating on a set of transform coefficients $x_k$ representative of respective frequency indices $f_k$ to produce an amplitude $y_1 = Q_1(x)$, the compression transcoder comprising a second generation quantiser $Q_2$, having a quantisation step size $q_2$ and a parameter $\lambda_2$ which controls the bounds of decision levels to be mapped onto representation levels of the quantiser, in which $\lambda_2$ is dynamically controlled in dependence upon values from the previous encoding of the digital signal, and in which the second generation $\lambda_2$ value is controlled as a function:

$$\lambda_2 = \lambda_2(f_k, q_1, \lambda_1, q_2, y_1).$$

2. A compression transcoder according to claim 1 in which the second generation $\lambda_2$ value is controlled as a function:

$$\lambda_2 = \lambda_2(f_k, q_1, \lambda_1, q_2, y_1, \lambda_{2,ref})$$

and in which the parameter $\lambda_{2,ref}$ represents a notional reference $(q_2, \lambda_{2,ref})$-type quantiser which bypasses the first generation coding and directly maps an original amplitude x onto a second generation reference amplitude $y_{2,ref} = Q_{2,ref}(x)$.

3. A compression transcoder according to claim 2 in which the parameter $\lambda_{2,ref}$ is selected empirically.

4. A compression transcoder according to claim 2 in which the parameter $\lambda_{2,ref}$ is fixed for each frequency.

* * * * *